United States Patent Office 3,792,101
Patented Feb. 12, 1974

3,792,101
PROCESS FOR PRODUCING REACTION PRODUCT OF 1,3-CONJUGATED DIENE COMPOUND AND COMPOUND HAVING TERMINAL VINYL GROUP AND CATALYST USED THEREFOR
Saburo Hattori and Kengo Tatsuoka, Tokyo, Japan, assignors to Mitsubishi Chemical Industries, Ltd., Tokyo, Japan
No Drawing. Filed Feb. 3, 1971, Ser. No. 112,433
Claims priority, application Japan, Feb. 9, 1970, 45/11,298; Mar. 19, 1970, 45/23,363; Mar. 20, 1970, 45/23,660; May 30, 1970, 45/46,524
Int. Cl. C07c *11/00*
U.S. Cl. 260—677 R    16 Claims

ABSTRACT OF THE DISCLOSURE

A reaction product of 1,3-conjugated diene compound and a compound having a terminal vinyl group is produced in the presence of a catalyst prepared by reacting (1) a palladium compound, (2) a compound having an anion selected from tetra- and hexafluoro-complex anion and perchlorate anion and (3) a phosphorous compound selected from a tertiary phosphine and a tertiary phosphite. When the compound having a terminal vinyl group is the same as the 1,3-conjugated diene compound, an oligomer of 1,3-conjugated diene compound is produced. On the other hand, when the two compounds are different, a co-oligomer of said two compounds is produced. When the phosphorous compound is not used or the phosphorous compound is other than phosphorous compound having at least two saturated hydrocarbon groups, an alcohol adduct of said oligomer can be produced when the reaction is in the presence of an alcohol.

BACKGROUND OF THE INVENTION

Field of the invention

This invention relates to a process for producing a reaction product of a 1,3-conjugated diene compound and a compound having a terminal vinyl group.

Description of the prior art

Addition reactions of a 1,3-conjugated diene compound and an α-olefin compound are known and also homo-oligomer reactions of a 1, 3-conjugated diene compound, such as butadiene or isoprene are known. It has been known to use Ni-Al type catalysts, Fe-Co-Al type catalysts and Pd-Al type catalysts for the addition reaction of a 1,3-conjugated diene compound and an α-olefin compound. It has also been known that Pd-P type catalysts, such as bis(triphenylphosphine) (maleic anhydride palladium): [(C₆H₅)₃P]₂ Pd(C₄H₂O₃), bis (triphenylphosphine) p-benzoquinone (palladium): (C₆H₅)₃P]₂ Pd(C₆H₄O),
are effective catalysts for producing oligomers of 1,3-butadiene, such as the chain dimer of butadiene.

SUMMARY OF THE INVENTION

An object of this invention is to provide a novel catalyst which is effective for producing a reaction product from a 1,3-conjugated diene compound and a compound having a terminal vinyl group.

Another object of this invention is to provide a process for producing a reaction product from a 1,3-conjugated diene compound and a compound having a terminal vinyl group by using a novel catalyst.

Another object of this invention is to provide a process for producing an oligomer such as a chain dimer, trimer, etc. of a 1,3-conjugated diene compound by oligomerizing a 1,3-conjugated diene compound in the presence of the novel catalyst.

Still another object of this invention is to provide a process for producing a co-dimer by reacting a 1,3-conjugated diene compound with a non-(conjugated diene) type vinyl compound in the presence of the novel catalyst.

A further object of this invention is to provide a process for producing an alcohol adduct of an oligomer such as a chain dimer, trimer, etc. of a 1,3-conjugated diene compound by oligomerizing a 1,3-conjugated diene compound in the presence of an alcohol and the novel catalyst.

These and other objects have now herein been attained by the use of a catalyst prepared by reacting (1) a palladium compound, (2) a compound having tetra- or hexa-fluoro-complex anion or perchlorate anion and (3) a tertiary phosphine or phosphite, which has been found to be effective for the addition reaction of a 1,3-conjugated diene compound and a compound having a terminal vinyl group.

DETAILED DESCRIPTION OF PREFERRED EMBODIMENTS

The 1,3-conjugated diene compound used in the process of this invention refers to compounds having the General Formula 1:

(1)

wherein each $R_1$ is the same or different and each represents hydrogen, halogen or an alkyl group; $R_2$ represents hydrogen, alkyl group or alkenyl group.

The typical examples of said 1,3-conjugated diene compound having the formula (1) include butadiene, isoprene, chloroprene, 1,3-pentadiene, 1,3,6-n-octatriene, 1, 3,7-n-octatriene, 1,3,6,10 - n - dodecatetraene. Especially good results are obtainable with butadiene.

The compound having a terminal vinyl group refers to compounds having the General Formula 2,

(2)

wherein $R_3$ represents hydrogen, alkyl group, a substituted or unsubstituted alkenyl group, a substituted or unsubstituted aryl group, an acyloxy group or an alkoxycarbonyl group.

Typical examples of said compound having a terminal vinyl group include α-olefins compounds, such as ethylene, propylene, butene, pentene, hexene; dienes, such as butadiene, isoprene, 1-acetoxy-2,7-octadiene, 1-methoxy-2,7-octadiene; vinyl aromatics, such as styrene; and esters, such as methyl acrylate, ethyl acrylate, vinyl acetate.

When the 1,3-conjugated diene compound having the Formula 1 is reacted with a compound having a terminal vinyl group and having the Formula 2 in accordance with the process of this invention, the following reaction products are mainly produced:

(3)

(4)

(5)

(6

Other isomers having a double bond in a different position can be produced instead of said co-dimers.

When said compound having a terminal vinyl group is the same as said 1,3-conjugated diene compound, the dimer and trimer of the diene compound can be produced. However, the dimer and trimer of the 1,3-conjugated diene compound are sometimes produced together with said co-dimer of Formulas 3, 4, 5, 6, and isomerse thereof, even though said compound having the terminal vinyl group is different from said 1,3-conjugated diene compound.

The catalyst used in the process of this invention is prepared by reacting (1) the palladium compound, (2) the compound having tetra- or hexa-fluoro-complex anion or perchlorate anion and (3) the tertiary phosphine or tertiary phosphite.

The palladium compound can be various palladium compounds such as organic salts, inorganic salts, complex salts and $\pi$-allyl type compounds of palladium. Included are the organic salts, such as palladium acetate: $Pd(OCOCH_3)_2$, palladium propionate: $Pd(OCO_2H_5)_2$, palladium benzoate: $Pd(OCOC_6H_5)_2$; halides, such as palladium chloride: $PdCl_2$, palladium bromide: $PdBr_2$, palladium iodide: $PdI_2$, intermolecular complexes, such as palladium acetylacetonate: $Pd(C_5H_8O_2)_2$; palladium halide complex having neutral ligands, such as bis(benzonitrile palladium chloride $Pd(C_6H_5CN)_2Cl_2$, bis(acetonitrile) palladium chloride $Pd(CH_3CN)_2Cl_2$, bis(dimethylformamide) palladium chloride $$Pd[HCON(CH_3)_2]_2Cl_2,$$

bis(dimethylacetoamide) palladium chloride $$Pd[CH_3CON(CH_3)_2]_2Cl_2,$$

bis(dimethylsulfoxide) palladium chloride $$Pd[OS(CH_3)_2]_2Cl_2;$$

$\pi$-allyl type palladium compounds such as $\pi$-allyl palladium acetate: $(\pi\text{—}C_3H_5\text{—}Pd\text{—}OCOCH_3)_2$, $\pi$-methallyl palladium acetate: $(\pi\text{—}C_4H_7\text{—}Pd\text{—}OCOCH_3)_2$, $\pi$-allyl palladium acetylacetonate: $(\pi\text{—}C_3H_5\text{—}Pd\text{—}C_5H_7O_2)$, $\pi$-methallyl palladium acetylacetonate:

$$(\pi\text{—}C_4H_7\text{—}Pd\text{—}C_5H_7O_2),$$

$\pi$-allyl palladium chloride: $(\pi\text{—}C_3\text{—}H_5\text{—}Pd\text{—}Cl)_2$, $\pi$-methallyl palladium chloride: $(\pi\text{—}C_4H_7\text{—}Pd\text{—}Cl)_2$, 1-methyl-$\pi$-allyl palladium chloride:

$$(\pi\text{—}C_4H_7\text{—}Pd\text{—}Cl)_2,$$

1,3-trimethyle-$\pi$-allyl palladium chloride; 1-methyl-3-butylene-$\pi$-allyl palladium chloride:

$$(\pi\text{—}C_8H_{13}\text{—}Pd\text{—}Cl)_2.$$

It is especially preferable to use a palladium halide complex having a neutral ligand or a $\pi$-allyl type palladium halide. The compound having flouro-complex anion or perchlorate anion used for the preparation of the catalyst can be a salt of a suitable cation and a tetrafluoroborate anion or a hexafluoro-silicate, phosphate, arsenate, antimonate or stannate anion or perchlorate anion. It is preferable to use a metal salt, especially a silver salt such as $AgBF_4$, $Ag_2SiF_6$, $AgPF_6$, $AgAsF_6$, $AgClO_4$ etc.

It is also possible to use $HBF_4$, $H_2SiF_6$ etc. When said acid is used, it is preferable to use the palladium compound having an acyloxy group or an acetylacetonate group, such as palladium acetate, $\pi$-allyl palladium acetate and palladium acetylacetonate.

The tertiary phosphine or tertiary phosphite used in the preparation of the catalyst is a phosphine having the general formula PR'R''R''' or a phosphite having the general formula P (OR') (OR'') (OR''') wherein R', R'' and R''' are the same or different from each other and represent an alkyl group, a cycloalkyl group or an aryl group.

The typical tertiary phosphines include triethylphosphine, triisopropylphosphine, tri-n-butylphosphine, tri-n-octylphosphine, tricyclohexylphosphine, triphenylphosphine, tri-p-toluylphosphine and monophenyl-di-n-butylphosphine and diphenyl-mono-n-butylphosphine. The typical tertiary phosphites include triethylphosphite tri-n-butylphosphite and triphenylphosphite.

The catalyst can be prepared by adding said components, without limiting the order of addition. The catalyst can be prepared by reacting (1) the palladium compound with (2) the compound having tetra- or hexa-fluoro-complex anion or perchlorate anion, and then adding (3) the tertiary phosphine or tertiary phosphite. It is also possible to prepare the catalyst by mixing (1) the palladium compound and (3) the tertiary phosphine or tertiary phosphite and then reacting the mixture with (2) the compound having tetra- or hexa-fluoro-complex anion or perchlorate anion. It is also possible to feed the three components (1) (2) (3), respectively, to an autoclave. Sometimes, butadiene is added for the preparation of the catalyst to stabilize the catalyst. It is usual to use an equivalent molar amount of said palladium compound and said compound having tetra- or hexa-fluoro-complex anion or perchlorate anion.

It is usual to use 0.1–2 gram equivalent, preferably 1 gram equivalent of said tertiary phosphine or tertiary phosphite to 1 gram equivalent of the palladium.

The prepared catalyst will contain a cationic palladium ion as a cation, and a tetrafluoroborate anion, hexafluoro silicate, phosphate arsenate, antimonate or stannate anion or pherchlorate anion. For example, 1 mole of $\pi$-allyl palladium chloride is reacted with 2 moles of silver fluoroborate to yield 2 moles of silver chloride precipitate, 2 gram equivalents of $\pi$-allyl palladium ion, and 2 gram equivalents of tetrafluoroborate complex anion.

The resultant anion is stable and is difficult to coordinate as a ligand, accordingly the palladium may promote the reaction together with the anion and phosphorous compound as active components in the cationic state. In this case, the precipitate of AgCl is in the catalyst, but it does not affect the reaction. Accordingly, it is not always necessary to separate the precipitate. The process for producing the reaction product of 1,3-conjugated diene compound and the compound having terminal vinyl group may be carried out by various processes.

For example, the catalyst is fed to an autoclave and an inert gas, such as nitrogen gas is used to replace the air. The 1,3-conjugated diene compound and the compound having a terminal vinyl group are further fed to the autoclave and the mixture is reacted by heating.

In the process of this invention, 0.1–10 mole, preferably 1.0–5.0 mole of said compound having a terminal vinyl group to 1 mole of said 1,3-conjugated diene compound is used. The amount of catalyst used is preferably, as palladium in a range of $10^{-1}$ to $10^{-5}$, preferably $10^{-2}$ to $10^{-4}$ parts by weight of said 1,3-conjugated diene compound.

The reaction is usually carried out at 10–200° C., preferably 50–150° C. under the pressure of 1–100 kg./cm.$^2$.

The process of this invention can be carried out without a solvent. However, the process is usually conducted in the presence of an inert solvent. The solvent is preferably an aprotic polar solvent, such as a hydrocarbon, e.g., benzene, toluene; substituted hydrocarbons, e.g., chlorobenzene; ether, e.g., tetrahydrofuran, dioxane; ester, e.g., methyl acetate, ketone, e.g., acetone. It is also possible to use an aliphatic alcohol, e.g., methanol, ethanol, propanol; aromatic alcohol, e.g., benzyl alcohol; cycloaliphatic alcohol, e.g., cyclohexanol; or multi-valent alcohol, e.g., ethylene glycol.

When the 1,3-conjugated diene compound is oligomerized in the presence of the alcohol, and the catalyst is prepared by using said phosphorous compound of tertiary phosphine having at least two saturated aliphatic hydrocarbon groups, such as triethylphosphine, tributylphosphine, tricyclohexylphosphine, monophenyl - di - n- butylphosphine, etc., the dimer and trimer of said 1,4-conjugated diene compound are produced.

When the catalyst is prepared without the phosphorous compound or by using a phosphorous compound other than said phosphorous compound, the alcohol adduct of a chain oligomer such as a dimer and trimer of said 1,3-conjugated diene compound is mainly produced with said non-alkoxy dimer and trimer.

The various reaction products produced by the process of this invention are useful as raw materials for various synthetic resins and detergents.

Having generally described the invention, a further understanding can be obtained by reference to certain specific examples which are provided herein for purposes of illustration only and are not intended to be limiting in any manner unless otherwise specified.

EXAMPLE 1

0.5 mmole of π-methallyl palladium chloride $(\pi-C_4H_7-Pd-Cl)_2$ and 1.0 mmole of tri-n-butylphosphine were dissolved in 40 ml. of toluene. The solution was fed to a 200 cc. autoclave and 0.47 g. of benzene solution of 1.0 mmole of silver tetrafluoroborate $AgBF_4$ was added. After replacing the autoclave with nitrogen gas, 32.5 g. (0.60 mole) of butadiene was fed under pressure, and ethylene was further fed to make 44 kg./cm.² at 80° C. The mixture was reacted at 80° C. under 44 kg./cm.² of total pressure for 6 hours.

The autoclave was cooled and excess ethylene was purged and the resultant product was separated by distillation. According to the analysis of the resultant product by gas chromatography, infrared spectrum, nuclear magnetic resonance spectrum, conversion of butadiene was 76% and the selectivities of the resultant products were as follows:

|   | Percent |
|---|---|
| 3-methyl-1,4-pentadiene | 2 |
| 1,4-hexadiene | 60 |
| 2,4-hexadiene | 28 |
| $C_8$–$C_{12}$ components | 4 |
| High boiling products ($C_{12}$ up) | 4 |

EXAMPLE 2

0.5 mmole of $(\pi-C_4H_7-Pd-Cl)_2$ and 1.0 mmole of $(n-C_4H_9)_3P$ were dissolved in 40 ml. of toluene. The solution was fed to a 200 cc. autoclave and 1.0 mmole of silver hexafluorophosphate $AgPF_6$ was added. After replacing the autoclave with nitrogen gas, 0.60 mole of butadiene and ethylene were further fed to make 40 kg./cm.² at 80° C. The mixture was reacted at 80° C. under 40 kg./cm.² of total pressure for 8 hours.

The resultant product was separated and analyzed in accordance with those of Example 1.

The conversion of butadiene was 92% and the selectivities of resultant products were as follows:

|   | Percent |
|---|---|
| 3-methyl-1,4-pentadiene | 2 |
| 1,4-hexadiene | 48 |
| 2,4-hexadiene | 40 |
| $C_8$–$C_{12}$ components | 4 |
| High boiling products ($C_{12}$ up) | 2 |

EXAMPLE 3

25 ml. of tetrahydrofuran containing 0.5 mmole of 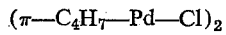 $(\pi-C_3H_5-Pd-Cl)_2$ and 1.0 mmole of $(n-C_4H_9)_3P$ was mixed with 5 ml. of tetrahydrofuran containing 1.0 mmole of $AgBF_4$, and thereby producing immediately white precipitate of AgCl. The resultant AgCl (1.0 mmole) was separated and the filtrate was fed to a 200 cc. autoclave, as catalyst. After replacing the autoclave with nitrogen gas, 0.70 mole of butadiene was fed under pressure and ethylene was further fed to make 50 kg./cm.² at 80° C. The mixture was reacted at 80–85° C. under 50 kg./cm.² of total pressure for 8 hours.

The autoclave was cooled and excess of ethylene was purged and the resultant product was separated by distillation to obtain 45–100° C. fraction, which was washed with water.

The product was analyzed in accordance with the process of Example 1. The conversion of butadiene was 86% and the selectivities of resultant products were as follows:

|   | Percent |
|---|---|
| 3-methyl-1,4-pentadiene | 2 |
| 1,4-hexadiene | 51 |
| 2,4-hexadiene | 37 |

EXAMPLE 4

30 ml. of chlorobenzene containing 0.5 mmole of $(\pi-C_4H_7-Pd-Cl)_2$ and 10 mmole of $(n-C_4H_9)_3P$ was mixed with 0.47 g. of benzene solution containing 1.0 mmole of $AgBF_4$.

The mixture was used as catalyst and butadiene and ethylene were reacted at 80° C. under the pressure of 50 kg./cm.² for 5 hours, in accordance with the process of Example 3. The conversion of butadiene was 70%, and the selectivities of resultant products were as follows:

|   | Percent |
|---|---|
| 3-methyl-1,4-pentadiene | 2 |
| 1,4-hexadiene | 70 |
| 2,4-hexadiene | 22 |
| High boiling products | 4 |

EXAMPLE 5

15 ml. of acetone containing 0.5 mmole of

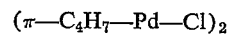 $(\pi-C_4H_7-Pd-Cl)_2$ was mixed with 5 ml. of acetone containing 1.0 mmole of $AgClO_4$. The resultant precipitate of AgCl was separated and 1.0 mmole of $(n-C_4H_9)_3P$ was added to the acetone solution to use as catalyst. The catalyst solution was fed to a 200 cc. autoclave and 0.5 mole of butadiene was fed under pressure and ethylene was further fed to make 30 kg./cm.² of total pressure at 85° C.

The mixture was reacted at 85° C. under the pressure of 30 kg./cm.² for 2 hours. After the reaction, 1.0 mmole of tetraphenyl arsonium chloride. $As(C_6H_5)_4Cl$ was added to the resultant product to separate $ClO_4^\ominus$ as precipitate of $As(C_6H_5)_4ClO_4$, and the filtrate was distilled.

The resultant product was analyzed in accordance with those of Example 1. The conversion of butadiene was 96% and the selectivities of resultant products were as follows:

|   | Percent |
|---|---|
| 3-methyl-1,4-hexadiene | 1 |
| 1,4-hexadiene | 48 |
| 2,4-hexadiene | 22 |
| $C_8$–$C_{12}$ components | 21 |
| High boiling products ($C_{12}$ up) | 4 |

EXAMPLE 6

20 ml. of acetone containing 0.5 mmole of

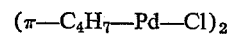 $(\pi-C_4H_7-Pd-Cl)_2$ and 1.0 mmole of $(n-C_4H_9)_3P$ was mixed with 0.5 mmole of $Ag_2SiF_6$.

The mixture was used as catalyst and 0.5 mole of butadiene and ethylene were reacted at 85° C. under the pressure of 27 kg./cm. for 3 hours. The conversion of butadiene was 30% and the selectivities of resultant products were as follows:

|   | Percent |
|---|---|
| 1,4-hexadiene | 81 |
| 2,4-hexadiene | 14 |
| 1,3,6-n-octadiene | 3 |

EXAMPLE 7

20 ml. of acetone containing 0.5 mmole of bis(benzonitrile) palladium chloride was mixed with 1.0 mmole of $AgClO_4$, and the precipitate of AgCl was removed and 1.0 mmole of $(n-C_4H_9)_3P$ was added to prepare the catalyst solution.

The catalyst solution and 0.6 mole of butadiene were fed to a 200 cc. autoclave and ethylene was further fed to make 43 kg./cm.$^2$ at 75° C. The mixture was reacted at 75° C. under the pressure of 43 kg./cm.$^2$ for 6 hours. The resultant product was treated in accordance with the process of Example 5. The conversion of butadiene was 80% and the selectivities of resultant products were as follows:

| | Percent |
|---|---|
| 3-methyl-1,4-pentadiene | 1 |
| 1,4-hexadiene | 68 |
| 2,4-hexadiene | 19 |
| High boiling products | 5 |

EXAMPLE 8

0.5 mmole of $(\pi-C_3H_5-Pd-Cl)_2$ was dissolved in 40 ml. of n-butanol, and then 1.0 mmole of $AgBF_4$ was added to it.

The precipitate of AgCl was removed from the solution and 1.0 mmole of $(n-C_4H_9)_3P$ was added to prepare catalyst solution. The catalyst solution and 0.6 mole of butadiene were fed in 200 cc. autoclave and ethylene was further fed to make 37 kg./cm.$^2$ of total pressure at 80° C. The mixture was reacted at 80° C. under the pressure of 37 kg./cm.$^2$ for 3 hours.

The conversion of butadiene was 98% and the selectivities of the resultant products were as follows:

| | Percent |
|---|---|
| 3-methyl-1,4-pentadiene | 14 |
| 1,4-hexadiene | 36 |
| 2,4-hexadiene | 40 |
| High boiling products | 1 |

EXAMPLE 9

1.0 mmole of bis(dimethylacetoamide) palladium chloride was dissolved in 20 ml. of isopropanol and 2.0 mmole of $AgPf_6$ was added. The precipitate of AgCl was removed and 1.0 mmole of n-butyl-diphenyl-phosphine was added to prepare the catalyst solution.

The catalyst solution and 0.7 mole of butadiene were fed to a 200 cc. autoclave and ethylene was further fed, to make 45 kg./cm.$^2$ of total pressure at 90° C.

The mixture was reacted at 90° C. under the pressure of 45 kg./cm.$^2$ for 4 hours.

The conversion of butadiene was 100% and the selectivities of resultant products were as follows:

| | Percent |
|---|---|
| 3-methyl-1,4-pentadiene | 2 |
| 1,4-hexadiene | 23 |
| 2,4-hexadiene | 59 |
| 1,3,6-n-octatriene | 11 |
| High boiling products | 2 |

EXAMPLE 10

30 ml. of benzene containing 0.5 mmole of

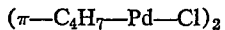

$$(\pi-C_4H_7-Pd-Cl)_2$$

and 1.0 mmole of $(n-C_4H_9)_3P$ was mixed with 1.0 mmole of $AgBF_4$.

The catalyst solution thus obtained was used and butadiene and other compounds having terminal vinyl group were reacted in accordance with the process of Example 1.

The conditions and results of the reactions were shown in the Table 1.

TABLE 1

| | | | | | | Percent | |
|---|---|---|---|---|---|---|---|
| Number | Butadiene, mole | Vinyl compound | Total pressure, kg./cm.² | Temp., °C. | Reaction time, hr. | Conversion | Selectivity of product |
| 1 | 0.6 | Propylene | 22 | 90 | 6 | 94 | n-Heptadiene, 27. iso-Heptadiene, 23. 1,3,6-n-octatriene, 23. High boiler, 20. |
| 2 | 0.2 | 1-acetoxy-2,7-octadiene, 0.2 mol | 5 | 90 | 6 | 100 | Acetoxy-dodecatriene, 43. 1,3,6-n-octatriene, 29. High boiler, 20. |

NOTE.—In the experiment No. 2, 20 ml. of benzene was used.

In the experiment No. 2, 20 ml. of benzene was used.

EXAMPLE 11

Butadiene and other compounds having a terminal vinyl group were reacted with the catalyst of Example 6, in accordance with the process of Example 1. The conditions and results of reactions were shown in the Table 2.

TABLE 2

| | | | | | | Percent | |
|---|---|---|---|---|---|---|---|
| Number | Butadiene, mole | Vinyl compound | Total pressure, kg./cm.² | Temp., °C. | Reaction time, hr. | Conversion | Selectivity of product |
| 1 | 0.5 | Methyl acrylate, 0.5 mol | 5 | 80 | 6.5 | 95 | Methy-2,5-heptadienoate, 70. 1,3,6-n-octatriene, 3. High boiler, 20. |
| 2 | 0.5 | Styrene, 0.5 mol [1] | 5 | 90 | 2 | 100 | 1-phenyl-1,4-hexadiene, 80. 1,3,6-n-octatriene, 9. n-Dodecatetraene, 5. |
| 3 | 0.6 | Vinyl acetate, 0.6 mol | | 95 | 6 | 95 | 1-acetoxy-1,4(2,4)-hexadiene, 16. 1,3,6-n-octatriene, 45. n-Dodecatetraene, 10. High boiler, 20. |

[1] The styrene was supplied for several times.

EXAMPLE 12

32.4 g. (0.30 mole) of 1,3,6-n-octatriene containing 0.5 mmole of $(\pi-C_4H_7-Pd-Cl)_2$ and 1.0 mmole of $(n-C_4H_9)_3P$ was mixed with 1.0 mmole of $AgBF_4$ in the solvent, and the mixture was fed in 200 cc. autoclave. Ethylene was further fed under pressure.

The conditions and results of reactions were shown in the Table 3.

TABLE 3

| Number | Solvent, ml. | Total pressure, kg./cm.² | Reaction Temp., °C. | Time, hr. | Percent Conversion of 1,3,6-n-octatriene | Selectivity of product |
|---|---|---|---|---|---|---|
| 1 | Benzene, 20 | 20 | 90 | 5 | 98 | n-Decatriene, 15. iso-Decatriene, 15. Isomers of 1,3,6-n-octatriene, 16. |
| 2 | Ethanol, 10 | 42 | 100 | 4 | 100 | n-Decatriene, 11. iso-Decatriene, 13. |

NOTE.—In Experiment 2, AgCl precipitate was removed from the catalyst solution.

EXAMPLE 13

0.5 mmole of $(\pi\text{—}C_4H_7\text{—}Pd\text{—}Cl)_2$ and 1.0 mmole of tri-n-butyl phosphite were added to 0.5 mole of methylacrylate and 1.0 mmole of $AgBF_4$ was further added to it. The precipitate of AgCl was removed from the resultant methylacrylate solution. The solution was fed to a 200 cc. autoclave and 0.4 mole of butadiene was fed to react them at 75° C. for 6 hours. The conversion of butadiene was 85%, and the selectivities of resultant products were as follows:

|  | Percent |
|---|---|
| Methylheptadienoate | 53 |
| High boiling products | 28 |

EXAMPLE 14

0.5 mmole of bis(dimethylacetoamide) palladium chloride was dissolved in 52 g. (0.60 mole) of methylacrylate and 1.0 mmole of $AgBF_4$ was further added. After removing the resultant precipitate of AgCl, 0.5 mmole of $(n\text{-}C_8H_{17})_3P$ was further added to the solution to prepare the catalyst solution.

The catalyst solution and 0.5 mole of butadiene were fed to a 200 cc. autoclave and were reacted at 85° C. for 5 hours.

The conversion of butadiene was 54% and the selectivities of resultant products were as follows:

|  | Percent |
|---|---|
| Methylheptadienoate | 46 |
| 1-carbomethoxy-3-cyclohexene | 30 |
| ⬡—COOCH₃ |  |
| 1,3,6-n-octatriene | 9 |
| High boiling products | 8 |

EXAMPLE 15

1.0 mmole of bis(dimethylacetoamide) palladium chloride, 1.0 mmole of $(n\text{-}C_4H_9)_3P$, and 0.2 g. of butadiene were dissolved in 20 ml. of methanol and 2.0 mmole of $AgBF_4$ was further added. The resultant precipitate of AgCl was removed from the solution to prepare the catalyst solution. The catalyst solution and 0.5 mole of butadiene were fed to a 200 cc. autoclave and propylene was further fed to make 22 kg./cm.² at 90° C.

The mixture was reacted at 90° C. under the pressure of 22 kg./cm.² for 6 hours. The conversion of butadiene was 84% and the selectivities of resultant products were as follows:

|  | Percent |
|---|---|
| n-Heptadiene | 18 |
| Iso-heptadiene | 20 |
| 1,3,6-n-octatriene | 18 |
| n-Dodecatetraene | 9 |
| High boiling products | 19 |

EXAMPLE 16

1.0 mmole of bis(dimethylacetoamide) palladium chloride and 1.0 mmole of tri-n-octylphosphine were dissolved in 52 g. of (0.5 mole) of styrene. 2.0 mmole of $AgBF_4$ was further added to it and the resultant precipitate of AgCl was removed and 1 ml. of methanol was added to the solution to prepare the catalyst solution. The catalyst solution and 0.5 mole of butadiene were fed to a 200 cc. autoclave, and were reacted at 85° C. for 75 minutes. The conversion of butadiene was 95%, and the selectivities of resultant products were as follows:

|  | Percent |
|---|---|
| 1-phenyl-1,4-hexadiene | 43 |
| 1,3,6-n-octatriene | 12 |

EXAMPLE 17

50.5 g. (0.3 mole) of 1-acetoxy-2,7-octadiene containing 1.0 mmole of bis(dimethylacetoamide) palladium chloride was mixed with 20 ml. of t-butanol containing 2.0 mmole of $AgBF_4$. The resultant precipitate of AgCl was removed and 1.0 mmole of $(n\text{-}C_4H_9)_3P$ was added to prepare the catalyst solution. The catalyst solution and 0.3 mole of butadiene were fed to a 200 cc. autoclave and were reacted at 90° C. for 6 hours. The conversion of butadiene was 54% and the selectivities of resultant products were as follows:

|  | Percent |
|---|---|
| Acetoxydodecatriene | 34 |
| 1,3,6-n-octatriene | 30 |
| High boiling products | 20 |

The following examples relate to oligomerizations of 1,3-butadiene wherein the compound having 1,3-conjugate diene type and the compound having terminal vinyl group are the same.

EXAMPLE 18

0.5 mmole of π-methallyl palladium chloride was dissolved in 20 ml. of acetone. 20 ml. of acetone containing 1.0 mmole of $AgBF_4$ was added to said solution.

The resultant precipitate of AgCl was removed and 1.0 mmole of various types phosphorous compounds were added, respectively, to prepare the catalyst solution.

The catalyst solution was fed to a 200 cc. autoclave, which was replaced with nitrogen gas, and 54 g. (1.0 mole) of butadiene was fed under pressure to react it. The conditions and results of reactions were shown in the Table 4.

TABLE 4

| Number | P compound | Reaction Temp., °C. | Time, hr. | Percent Conversion of butadiene | Selectivities of product |
|---|---|---|---|---|---|
| 1 | (n-C₄H₉)₃P | 100 | 1.5 | 81 | 1,3,6-n-octatriene, 46. n-Dodecatetraene, 38. n-Hexadecapentaene, 1. High boiler, 10. |
| 2 | (C₄H₉)₃P | 100 | 3 | 92 | 1,3,6-n-octatriene, 34. n-Dodecatetraene, 31. n-Hexadecapentaene, 2. |
| 3 | (C₆H₅O)₃P | 100 | 8 | 85 | 1,3,6-n-octatriene, 29. n-Dodecatetraene, 24. High boiler, 41. |

EXAMPLE 19

The catalyst solution was prepared in accordance with the process of Example 18 except π-allyl palladium chloride (π—C₃H₅—Pd—Cl)₂ was replaced for π-methallyl palladium chloride and n-butyl-diphenylphosphine (n-C₄H₉)(C₆H₅)₂P was used as phosphorous compound.

The catalyst solution and 1.0 mole of butadiene were fed to a 200 cc. autoclave and were reacted at 100° C. for 3 hours.

The conversion of butadiene was 90%, and the selectivities of resultant products were as follows:

|   | Percent |
|---|---|
| 1,3,6-n-octatriene | 35 |
| n-Dodecatetraene | 36 |
| n-Hexadecapentaene | 3 |
| High boiling products | 18 |

EXAMPLE 20

40 ml. of acetone containing 0.5 mmole of π-methallyl palladium chloride and 1.0 mmole of AgClO₄ was mixed with 1.0 mmole of (n-C₄H₉)₃P to prepare the catalyst solution. The catalyst solution and 1.0 mole of butadiene were fed to a 200 cc. autoclave and were reacted at 100° C. for 5 hours. After the reaction, 1.0 mmole of tetraphenylarsonium chloride was added to the resultant product to remove ClO₄⁻ as precipitate As(C₆H₅)₄ClO₄.

The resultant solution was distilled to separate the reaction products. The conversion of butadiene was 70% and the selectivities of resultant products were as follows:

|   | Percent |
|---|---|
| 1,3,6-n-octatriene | 51 |
| n-Dodecatetraene | 34 |
| High boiling products | 5 |

EXAMPLE 21

30 ml. of benzene containing 0.5 mmole of π-methallyl palladium chlorile and 1.0 mmole of (n-C₄H₉)₃ was mixed with 30 ml. of benzene containing 1.0 mmole of AgBF₄.

The resultant catalyst solution and 1.0 mole of butadiene were fed to a 200 cc. autoclave and were reacted at 80° C. for 6 hours.

The conversion of butadiene was 71%, and the selectivities of resultant products were as follows:

|   | Percent |
|---|---|
| 1,3,6-n-octatriene | 69 |
| n-Dodecatetraene | 25 |
| High boiling products | 3 |

EXAMPLE 22

20 ml. of tetrahydrofuran containing 1.0 mmole of bis (benzonitrile) palladium chloride (C₆H₅CN)₂Pd—Cl₂ was mixed with about 0.2 g. of butadiene, and then 2.0 mmole of AgBF₄ was added. The resultant precipitate of AgCl was removed and 1.0 mmole of (n-C₄H₉)₃P was added. The resultant catalyst solution and 1.5 mole of butadiene were fed to a 200 cc. autoclave and were reacted at 10° C. for 6 hours.

The conversion of butadiene was 71%, and the selectivities of resultant products were as follows:

|   | Percent |
|---|---|
| 1,3,6-n-octatriene | 33 |
| n-Dodecatetraene | 35 |
| High boiling products | 24 |

EXAMPLE 23

20 ml. of benzene containing 1.0 mole of bis(benzonitrile) palladium chloride and 1.0 mmole of (n-C₈H₁₇)₃P was fed to a 200 cc. autoclave. Further 2.0 mmole of AgBF₄ and 1.0 mole of butadiene were added and reacted at 100° C. for 4 hours.

The conversion of butadiene was 95% and the selectivities of resultant products were as follows:

|   | Percent |
|---|---|
| 1,3,6-n-octatriene | 36 |
| n-Dodecatetraene | 34 |
| High boiling products | 20 |

EXAMPLE 24

0.2 g. of butadiene was dissolved in 40 ml. of acetone containing 0.5 mmole of bis (dimethyl-acetoamide)palladium chloride and 1.0 mmol. of AgBF₄ was added. The resultant precipitate of AgCl was removed and 0.5 mmole of (n-C₄H₉)₃P was added.

The resultant catalyst solution and 1.0 mole of butadiene were fed to a 200 cc. autoclave and were reacted at 100° C. for 5 hours.

The conversion of butadiene was 53%, and the selectivities of resultant products were as follows:

|   | Percent |
|---|---|
| 1,3,6-n-octatriene | 66 |
| n-Dodecatetraene | 22 |
| High boiling products | 7 |

The following examples relate to oligomerization of 1,3-butadiene wherein various alcohols were respectively used as solvent. When a tertiary phosphine having at least two saturated aliphatic hydrocarbon groups is employed as phosphine compound, the dimer and trimer of 1,3-butadiene were mainly produced. When the other phosphine is employed, the alcohol adduct of the dimer and trimer as well as said dimer of 1,3-butadiene, were produced.

EXAMPLE 25

32 g. of methanol containing 2.0 mmole of AgBF₄ was mixed with 1.0 mmole of palladium chloride and the mixture was reacted at room temperature for 2 hours while stirring. The resultant precipitate of AgCl was removed and 1.0 mmole of (n-C₄H₉)₃P was added.

The resultant catalyst solution and 1.0 mmole of butadiene were fed to a 200 cc. autoclave and were reacted at 90° C. for 6 hours.

The conversion of butadiene was 94%, and the selectivities of resultant products were as follows:

|   | Percent |
|---|---|
| 1,3,6-n-octatriene | 43 |
| n-Dodecatetraene | 34 |
| n-Hexadecapentaene | 4 |
| High boiling products | 15 |

EXAMPLE 26

0.5 mmole of π-methallyl palladium chloride was dissolved in the mixture of 20 ml. of acetone and 20 ml. of methanol, and 1.0 mmole of $AgBF_4$ was further added. The resultant precipitate of AgCl was removed and 1.0 mmole of $(n-C_4H_9)_3P$ was added.

The resultant catalyst solution and 1.0 mole of butadiene were fed to a 200 cc. autoclave, and were reacted at 90° C. for 8 hours. The conversion of butadiene was 96% and the selectivities of resultant products were as follows:

| | Percent |
|---|---|
| 1,3,6-n-octatriene | 35 |
| n-Dodecatetraene | 37 |
| n-Hexadecapentaene | 4 |
| High boiling products | 20 |

EXAMPLE 27

The catalyst solution was prepared in accordance with the process of Example 25 except 40 ml. of methanol containing 2.0 mmole of $AgClO_4$ was used. The resultant catalyst solution and 1.0 mole of butadiene were fed to a 200 cc. autoclave and were reacted at 90° C. for 9 hours.

The conversion of butadiene was 85%, and the selectivities of resultant products were as follows:

| | Percent |
|---|---|
| 1,3,6-n-octatriene | 29 |
| n-Dodecatetraene | 26 |
| High boiling products | 20 |

EXAMPLE 28

1.0 mole of butadiene was reacted at 90° C. for 8 hours in the presence of the catalyst solution prepared by adding 1.0 mmole of $(n-C_4H_9)_3P$ to methanol solution containing 1.0 mmole of bis(dimethylacetoamide) palladium chloride and 1.0 mmole of $Ag_2SiF_6$. The conversion of butadiene was 62%, and the selectivities of resultant products were as follows:

| | Percent |
|---|---|
| 1,3,7-n-octatriene | 7 |
| 1,3,6-n-octatriene | 52 |
| n-Dodecatetraene | 20 |
| High boiling products | 3 |

EXAMPLE 29

1.0 mole of butadiene was reacted at 90° C. for 6 hours in the presence of the catalyst solution prepared by adding 2.0 mmole of $AgBF_4$ to 40 ml. of methanol containing 1.0 mmole of bis(dimethylformamide) palladium chloride, 1.0 mmole of monophenyl-di-n-butylphosphine and 0.3 g. of butadiene, and removing the resultant precipitate of AgCl. The conversion of butadiene was 66%, and the selectivities of resultant products were as follows:

| | Percent |
|---|---|
| 1,3,7-n-octatriene | 15 |
| 1,3,6-n-octatriene | 24 |
| Methoxyoctatriene | 13 |

EXAMPLE 30

1.5 mole of butadiene was reacted at 100° C. for 5.5 hours in the presence of the catalyst prepared by adding about 0.2 g. of butadiene to 20 ml. of t-butanol containing 1.0 mmole of bis(dimethylacetoamide)palladium chloride and then adding 2.0 mmole of $AgBF_4$ and removing the resultant precipitate of AgCl and then adding 1.0 mmole of $(n-C_4H_9)_3P$.

The conversion of butadiene was 67%, and the selectivities of resultant products were as follows:

| | Percent |
|---|---|
| 1,3,6-n-octatriene | 62 |
| n-Dodecatetraene | 28 |
| High boiling products | 5 |

EXAMPLE 31

0.1 mole of butadiene was reacted at 80° C. for 6 hours in the presence of catalyst solution prepared by adding 1.0 mmole of triphenylphosphine to 32 g. of methanol containing 0.5 mmole of π-methallyl palladium chloride and 1.0 mmole of $AgBF_4$.

The conversion of butadiene was 91%, and the selectivities of resultant products were as follows:

| | Percent |
|---|---|
| 1,3,7-n-octatriene | 15 |
| Methoxy-n-octadiene | 42 |
| Methoxy-n-dodecatriene | 20 |
| Methoxy-n-hexadecatetraene | 2 |
| 3-methoxy-1-butene | 10 |

EXAMPLE 32

Butadiene was reacted in accordance with the process of Example 31 except 1.0 mmole of triphenyl phosphite was used as phosphorous compound and the reaction time was 9 hours. The conversion of butadiene was 64% and the selectivities of resultant products were as follows:

| | Percent |
|---|---|
| 1,3,7-n-octatriene | 31 |
| Methoxy-n-octadiene | 36 |
| Methoxy-n-dodecatriene | 14 |
| Methoxy-n-hexadecatetraene | Small amount |

The following examples relate to oligomerization of 1,3-butadiene in the presence of alcohol without phosphorous compound for producing alcohol adduct of chain oligomer of dimer and trimer, and tetramer.

EXAMPLE 33

0.5 mmole of π-methallyl palladium chloride was dissolved in 40 ml. of methanol and 0.5 g. of benzene containing 1.0 mmole of $AgBF_4$ was added at room temperature in nitrogen gas atmosphere. The resultant precipitate of AgCl was removed. The catalyst solution was fed to a 200 cc. autoclave and 1.0 mole of butadiene was fed under pressure and was reacted at 60° C. for 7 hours. The autoclave was cooled after the reaction and unreacted butadiene was recovered, and then the resultant product was vacuum distilled to obtain 30 g. of dimer fraction, 17 g. of trimer and tetramer fraction, 3.3 g. of pentamer and hexamer fraction and 1 g. of high boiling components.

The conversion of butadiene was 77% and the selectivities of resultant products were as follows:

| | Selectivity, percent | Ratio | Percent |
|---|---|---|---|
| 1-methoxy-2,7-octadiene | 54 | 1-adduct | 97 |
| 3-methoxy-1,7-octadiene | | 3-adduct | 3 |
| 1-methoxy-n-dodecatriene | 2 | 1-adduct | 80 |
| 3-methoxy-n-dodecatriene | | 3-adduct | 20 |
| 3-methoxy-n-hexadecatetraene | 33 | 1-adduct is negligible | |
| Methoxy-n-eicosapentaene | 2 | | |
| Methoxy-n-tetracosahexaene | 5 | | |

EXAMPLE 34

30 ml. of acetone containing 1.2 mmole of palladium chloride as suspension was mixed with 1 g. of benzene containing 2.0 mmole of $AgBF_4$ and stirred at room temperature in nitrogen gas atmosphere. The resultant precipitate of AgCl and unreacted palladium chloride were removed. The resultant catalyst solution was fed to a 200 cc. autoclave and 0.5 mole of methanol and 1.0 mole of butadiene were fed in it.

The reaction was made at 80° C. for 7 hours. The conversion of butadiene was 50% and the selectivities of resultant products were as follows:

| | Percent |
|---|---|
| Methoxy-n-octadiene (1-adduct 97%) | 66 |
| Methoxy-n-dodecatriene (1-adduct 76%) | 12 |
| Methoxy-n-hexadecatetraene | 16 |

EXAMPLE 35

The reaction was repeated in accordance with the process of Example 34, except 1.0 mmole of bis(dimethylformamide) palladium chloride was replaced for 1.2 mmole of palladium chloride, and the reaction time was 9 hours.

The conversion of butadiene was 70%, and the selectivities of resultant products were as follows:

|  | Percent |
|---|---|
| Methoxy-n-octadiene | 54 |
| Methoxy-n-dodecatriene | 15 |
| Methoxy-n-hexadecatetraene | 18 |
| Methanol adduct of higher oligomer | 5 |

EXAMPLE 36

The reaction was repeated in accordance with the process of Example 35, except bis(dimethylsulfoxide) palladium chloride was replaced for bis(dimethylformamide) palladium chloride. The conversion of butadiene was 43% and the selectivities of resultant products were as follows:

|  | Percent |
|---|---|
| 1,3,7-n-octatriene | 8 |
| Methoxy-n-octadiene | 60 |
| Methoxy-n-dodecatriene | 20 |
| Methoxy-n-hexadecatetraene | 7 |

EXAMPLE 37

1.0 mmole of palladium chloride was dissolved in 15 ml. of acetone containing 2.0 mmole of N-methylpyrrolidine and about 0.5 g. of butadiene was further dissolved. 1.0 g. of benzene containing 2.0 mmole of AgBF$_4$ was added to said solution and the resultant precipitate of AgCl and palladium metal produced by reduction were removed. The resultant catalyst solution, 10.5 moles of methanol and 1.0 mole of butadiene were fed to a 200 cc. autoclave and were reacted at 80° C. for 8 hours. The conversion of butadiene was 81% and the selectivities of resultant products were as follows:

|  | Percent |
|---|---|
| Methoxy-n-octadiene | 30 |
| Methoxy-n-dodecatriene | 6 |
| Methoxy-n-hexadecatetraene | 36 |
| Alcohol adduct of higher oligomer | 25 |

EXAMPLE 38

Acetone solution containing 1.0 mmole of palladium chloride and 1.0 mmole of Ag$_2$SiF$_6$ was fed to a 200 cc. autoclave and 0.5 mole of methanol and 1.0 mole of butadiene were further fed and reacted at 70° C. for 9 hours.

The conversion of butadiene was 70%, and the selectivities of resultant products were as follows

|  | Percent |
|---|---|
| Methoxy-n-octadiene | 56 |
| Methoxy-n-dodecatriene | 9 |
| Methoxy-n-hexadecatetraene | 23 |

EXAMPLE 39

0.5 mole of methanol solution containing 0.5 mmole of palladium chloride, 1.0 mmole of AgBF$_4$, and 200 mmole of dimethylformamide was fed to a 200 cc. autoclave and 1.0 mole of butadiene was fed in it and reacted at 80° C. for 6 hours. The conversion of butadiene was 78%, and the selectivities of resultant products were as follows:

|  | Percent |
|---|---|
| Methoxy-n-octadiene | 54 |
| Methoxy-n-dodecatriene | 4 |
| Methoxy-n-hexadecatetraene | 22 |

EXAMPLE 40

1.0 mmole of AgClO$_4$ was added to 1.0 mole of methanol containing 0.5 mmole of π-methallyl palladium chloride, and the resultant precipitate of AgCl was removed. The catalyst solution and 1.0 mole of butadiene were fed to a 200 c. of autoclave and reacted at 80° C. for 3 hours. After recovering unreacted butadiene, 1.0 mmole of tetraphenylarsonium chloride was added to the resultant product for removing ClO$_4^-$. The resultant solution was distilled. The conversion of butadiene was 16% and the selectivities of resultant products were as follows:

|  | Percent |
|---|---|
| Methoxy-n-octadiene (1-adduct 88%) | 69 |
| Methoxy-n-dodecatriene (1-adduct 65%) | 12 |
| Methoxy-n-hexadecatetraene | 16 |

EXAMPLE 41

0.5 mmole of π-methallyl palladium chloride and 1.0 mmole of AgBF$_4$ were dissolved in various alcohols to prepare catalyst solutions. The catalyst solution and 1.0 mole of butadiene were fed to a 200 cc. autoclave and reacted. The conditions and results of reactions were shown in the Table 5.

TABLE 5

| No. | Alcohol, mole | Reaction Temp., °C. | Time, hr. | Percent Conversion of butadiene | Selectivity |
|---|---|---|---|---|---|
| 1 | Ethanol, 1.0 | 70 | 10 | 44 | Ethoxy-n-octadiene, 43. Ethoxy-n-dodecatriene, 7. Ethoxy-n-hexadecatetraene, 13. |
| 2 | Isopropanol, 0.50 | 60 | 10 | 22 | Isopropoxy-n-octadiene, 65. Isopropoxy-n-dodecatriene, 9. Isopropoxy-n-hexadecatetraene, 26. |

NOTE.—In Experiment 2, 30 ml. of benzene was used as solvent.

What is claimed as new and desired to be secured by Letters Patent of the United States is:

1. In a process for producing an unsaturated addition product of a conjugated diene compound and a compound having a terminal vinyl group which comprises reacting a conjugated diene compound having the general formula of:

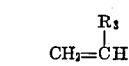

wherein each R$_1$ is the same or different and each represents hydrogen, or an alkyl group; and R$_2$ represents hydrogen, alkyl or an alkenyl group, with a compound having a terminal vinyl group and having the general formula of:

wherein R$_3$ represents hydrogen, an alkyl group, a substituted or unsubstituted alkenyl group; the improvement wherein said reaction is effected in the presence of a catalyst prepared by reacting (1) a palladium compound selected from the group consisting of inorganic acid salts of palladium, organic acid salts of palladium and complexes of palladium, (2) a compound having a cation, and an anion selected from the group consisting of tetrafluoroborate, hexafluoro-silicate, hexafluoro-phosphate, hexafluoro-arsenate, hexafluoro-antimonate, hexafluoro-stannate and perchlorate, and (3) a phosphorus compound selected from the group consisting of a tertiary phosphine having the general formula of:

PR'R''R''' wherein R', R'', and R''' are the same or different and each represents alkyl, cycloalkyl or aryl group, and a tertiary phosphite having the general formula of:

P(OR')(OR'')(OR''')

wherein the definition of R', R'' and R''' is the same as the above definition.

2. A process of claim 1 wherein the complex of palladium is an intermolecular complex, a palladium chloride complex having neutral ligand or a π-allyl type palladium chloride.

3. A process of claim 1 wherein the compound having tetra- or hexa-fluoro-complex anion or perchlorate anion is a silver salt of said anion.

4. A process of claim 1 wherein the reaction temperature is between 10° and 200° C.

5. A process of claim 2 wherein the palladium complex is π-allyl palladium chloride, π-methallyl palladium chloride, 1-methyl-π-allyl palladium chloride, bis(benzonitrile)palladium chloride, bis(dimethylacetoamide)palladium chloride or bis(dimethylformamide) palladium chloride.

6. A process of claim 1 wherein the compound (2) is $AgBF_4$, $AgPF_6$, $Ag_2SiF_6$ or $AgClO_4$.

7. A process of claim 1 wherein the phosphorous compound is tri-n-butylphosphine, tri-n-octylphosphine, triphenylphosphine, diphenyl-n-butylphosphine, tri-n-butyl phosphite, or triphenyl phosphite.

8. A process of claim 1 wherein an aprotic polar solvent is used as a solvent.

9. The process of claim 1 wherein said reaction is conducted in the presence of an alcohol and wherein said phosphorous compound is a tertiary phosphine containing at least two saturated hydrocarbons of an alkyl or cycloalkyl group.

10. A process of claim 9 wherein said phosphorous compound is tri-n-butylphosphine or di-n-butylmonophenylphosphine.

11. A process of claim 9 wherein said alcohol is selected from the group consisting of methanol, ethanol, isopropanol, n-butanol or isobutanol.

12. The process of claim 1 wherein $R_3$ represents

so as to form a conjugated diene compound having a terminal vinyl group wherein the definitions of $R_1$ and $R_2$ are the same as the above definition, and wherein the reaction product is a chain oligomer or co-oligomer.

13. A process of claim 12 wherein the conjugated diene compound and the compound having a terminal vinyl group are 1,3-butadiene and isoprene respectively.

14. The process of claim 1 wherein said compound having a terminal vinyl compound is an α-monoolefin and wherein the reaction product is a co-dimer.

15. A process of claim 14 wherein said 1,3-conjugated diene compound is 1,3-butadiene, and said α-monoolefin having a terminal vinyl group is ethylene or propylene.

16. A process of claim 14 wherein the conjugated diene compound is 1,3,6-n-octatriene and said compound having a terminal vinyl group is ethylene.

References Cited
UNITED STATES PATENTS

| | | | |
|---|---|---|---|
| 3,398,168 | 8/1968 | Medema | 260—429 |
| 3,534,088 | 10/1970 | Bryant et al. | 260—497 |

DELBERT E. GANTZ, Primary Examiner

J. M. NELSON, Assistant Examiner

U.S. Cl. X.R.

260—666 B, 680 R